United States Patent
Chung et al.

(10) Patent No.: US 7,631,488 B2
(45) Date of Patent: Dec. 15, 2009

(54) OXIDATION CATALYST FOR REMOVING FINE SOOT PARTICULATES FROM EXHAUST GASES AND METHOD OF REMOVING FINE SOOT PARTICULATES USING THE SAME

(75) Inventors: Jong Shik Chung, Ulsan (KR); Ji Hyang Shon, Busan (KR); Young Nam Kim, Seoul (KR)

(73) Assignee: Postech Foundation, Kyungsangbook-Do (KR)

( * ) Notice: Subject to any disclaimer, the term of this patent is extended or adjusted under 35 U.S.C. 154(b) by 204 days.

(21) Appl. No.: 11/588,677

(22) Filed: Oct. 27, 2006

(65) Prior Publication Data

US 2008/0102002 A1    May 1, 2008

(51) Int. Cl.
*F01N 3/28* (2006.01)
*B01J 23/02* (2006.01)

(52) U.S. Cl. .................... 60/274; 502/344; 502/350
(58) Field of Classification Search ............ 60/274, 60/297, 301; 502/325, 344, 350
See application file for complete search history.

(56) References Cited

U.S. PATENT DOCUMENTS

| | | | |
|---|---|---|---|
| 1,697,929 A | 1/1929 | Ryan | |
| 4,769,356 A * | 9/1988 | Takeuchi et al. | 502/242 |
| 5,622,680 A | 4/1997 | Monceaux et al. | |
| 5,876,681 A | 3/1999 | Barthe et al. | |
| 5,911,961 A | 6/1999 | Horiuchi et al. | |
| 6,274,107 B1 | 8/2001 | Yavuz et al. | |
| 6,685,900 B2 | 2/2004 | Domesle et al. | |
| 2003/0040432 A1 * | 2/2003 | Beall et al. | 502/332 |
| 2003/0086835 A1 | 5/2003 | Suzawa et al. | |
| 2004/0040287 A1 * | 3/2004 | Beutel et al. | 60/285 |
| 2006/0035780 A1 * | 2/2006 | Xu et al. | 502/66 |
| 2006/0120936 A1 * | 6/2006 | Alive et al. | 423/215.5 |
| 2007/0053818 A1 * | 3/2007 | Lauterbach et al. | 423/239.1 |

FOREIGN PATENT DOCUMENTS

| | | | |
|---|---|---|---|
| CN | 1526474 A | | 9/2004 |
| EP | 0207367 A1 | | 1/1987 |
| EP | 0722767 A | | 7/1996 |
| JP | 2003-135976 | | 5/2003 |
| JP | 2004-232904 | | 8/2004 |
| JP | 2005144343 | * | 6/2005 |
| JP | 2005144343 A | * | 6/2005 |
| KR | 1020030007993 A | | 1/2003 |
| KR | 1020030028121 A | | 4/2003 |
| KR | 1020030091346 A | | 12/2003 |
| KR | 1020040095166 A | | 11/2004 |

OTHER PUBLICATIONS

Ming et al., "A simple approach to mesoporous fibrous titania from potassium dititanate", *Chemical Communications*, pp. 2202-2203 (2004).
Jong Shik Chung, "Potassium Dititanate Catalysts for Abatement of Soot", Chemical Engineering Department, Frontier Research in Environment & Energy (FREE), Jan. 2006.

* cited by examiner

*Primary Examiner*—Thomas E Denion
*Assistant Examiner*—Jonathan Matthias
(74) *Attorney, Agent, or Firm*—Robert A. Koons, Jr., Esq.; Matthew S. Bodenstein, Esq.; Drinker Biddle & Reath LLP

(57) ABSTRACT

Disclosed herein is an oxidation catalyst for use in removing fine soot particulates from exhaust gases of diesel engines, incinerators, boilers or other combustion devices, and to a method of removing fine soot particulates using the oxidation catalyst. The oxidation catalyst of the current invention functions to effectively remove fine soot particulates at a low temperature, and also, has thermal durability, and thus, the activity of the catalyst may be stably maintained even under thermal stress for a long time period. Further, the catalyst prevents poisoning due to a sulfur compound present in exhaust gases, and can maintain stable activity.

10 Claims, No Drawings ed States Patent

US 7,631,488 B2

OXIDATION CATALYST FOR REMOVING FINE SOOT PARTICULATES FROM EXHAUST GASES AND METHOD OF REMOVING FINE SOOT PARTICULATES USING THE SAME

FIELD OF THE INVENTION

The present invention relates, generally, to an oxidation catalyst for removing fine soot particulates from exhaust gases and a method of removing fine soot particulates using the same. More particularly, the present invention relates to an oxidation catalyst including titanium, which is used to remove fine soot particulates from exhaust gases of diesel engines, incinerators, or boilers, at a lower temperature, and to a method of removing fine soot particulates using the oxidation catalyst.

BACKGROUND OF THE INVENTION

In general, diesel engines are advantageous because they have various uses due to their high power and ability to be operated even under high loads. However, since exhaust gases discharged from such diesel engines are a major source of air pollution, their allowable discharge standard becomes more and more strict throughout the world. The main pollutants from diesel engines include fine soot particulates, hydrocarbons, carbon monoxide, soluble organic solvents, and nitrogen oxides. In particular, the soot particulates and $NO_x$ directly impact life, such as increasing a generation rate of cancer of the respiratory organs, and thus, diesel exhaust gases are classified as carcinogenic material by IARC (The International Agency for Research on Cancer) and USEPA (The US Environmental Protection Agency). Hence, various treatment techniques for removing diesel exhaust gases have been devised. Such techniques are largely divided into engine improvement techniques and post-treatment techniques. Of these techniques, as post-treatment techniques, methods of removing soot particulates and of removing $NO_x$ have chiefly been developed. However, the former engine improvement techniques need to be more urgently realized.

At present, the removal of soot particulates from exhaust gases chiefly depends on regeneration processes following the collection. However, the above process is disadvantageous because a filter for use in the removal of soot particulates may be internally clogged by cake-like particulates over time. With the goal of prolonging the lifetime of the filter, the combustion of the adsorbed soot particulates is periodically required. During the past several years, many attempts to regenerate a filter have been vigorously made, and the following techniques have been actualized:

(1) Combustion of soot using an external heat source, such as a heater or a burner;
(2) Formation of combustion conditions of soot using engine control, such as an increase in exhaust gas temperature; and
(3) Reduction in a combustion temperature of soot using a catalyst.

Particularly, regeneration methods using a catalyst are advantageous because high regeneration efficiency can be simply realized without additional power or energy consumption. The above methods are typically realized by coating a filter with a catalyst including a precious metal component such as platinum (Pt) or palladium (Pd) (U.S. Pat. Nos. 6,685,900, 6,274,107, and 5,911,961, and Korean Patent Laid-open Publication Nos. 2003-0028121, 2003-0007993, 2003-0091346, and 2004-0095166). However, since the use of a precious metal in a high concentration of about 2.5-7 g/L is required to decrease the oxidation temperature of soot, the preparation cost increases and the amount of soot particulates is somewhat increased due to the formation of sulfur oxides. As a non-precious metal catalyst, an $NO_x$ reduction catalyst including $ZnAl_2O_3$ as Spinel-based crystals is disclosed (U.S. Pat. No. 5,876,681), and a Perovskite type metal oxide catalyst including a small amount of platinum is disclosed (U.S. Pat. No. 5,622,680). Although the above catalysts are said to take charge of effective oxidation of soot particulates, the development of more effective catalysts usable at lower temperatures is necessary, taking into account that the exhaust gas temperature of diesel engines ranges from 150 to 350° C.

In addition, soot particulates may be formed due to the incomplete combustion in boilers or incinerators using fossil fuel, and as well, the soot particulates thus formed are precipitated in a boiler pipe or an exhaust pipe, thus decreasing the combustion efficiency and requiring the washing of the exhaust pipe. Therefore, there is urgently required the development of a catalyst that is used to oxidize the precipitated soot particulates to be removed, does not deteriorate at high temperatures, and is not poisoned even in the presence of $SO_2$.

SUMMARY OF THE INVENTION

Leading to the present invention, intensive and thorough research into oxidation catalysts, carried out by the present inventors, resulted in the finding that an oxidation catalyst including titanium may be used, whereby fine soot particulates can be effectively removed at a lower temperature, and thermal durability of the catalyst is exhibited, and also, the activity of the catalyst can be maintained without being poisoned in conjunction with a sulfur compound.

Accordingly, an object of the present invention is to provide an oxidation catalyst for removing fine soot particulates from exhaust gases of diesel engines, incinerators or boilers.

Another object of the present invention is to provide a method of removing fine soot particulates using the oxidation catalyst.

In order to accomplish the above objects, the present invention provides an oxidation catalyst for removing fine soot particulates, which is represented by the structural formula below:

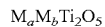

Wherein $M_a$ is potassium as an essential element; $M_b$, if present, is at least one cation metal selected from the group consisting of Na, Li, Ca, Mg, Ba, Sr, La, Co, Fe, Ni, Cr, Mn, Zn, Cu, Cd, Mo, V, W, Ce, Bi, Sn, Sb, Pd, Pt, Ru and Rh; a is equal to or less than 2; and b is 0 to 2/n, wherein n is cation charge of metal element of $M_b$.

In addition, the present invention provides a method of removing fine soot particulates, comprising contacting fine soot particulates of exhaust gases with the above oxidation catalyst to oxidize the fine soot particulates using oxygen, NO, or $NO_2$ in exhaust gases at 150-650° C. thus removing fine soot particulates.

DESCRIPTION OF THE PREFERRED EMBODIMENTS

Hereinafter, a detailed description will be given of the present invention.

The present invention provides an oxidation catalyst, which has a structural formula represented by $M_aM_bTi_2O_5$, wherein $M_a$ is potassium as an essential element; $M_b$ may be present or absent, and, if present, is at least one cation metal selected from the group consisting of Na, Li, Ca, Mg, Ba, Sr, La, Co, Fe, Ni, Cr, Mn, Zn, Cu, Cd, Mo, V, W, Ce, Bi, Sn, Sb, Pd, Pt, Ru and Rh. In the structural formula of the oxidation catalyst of the present invention, a is equal to or less than 2 and b is 0 to 2/n, wherein n is cation charge of the metal element of $M_b$.

As the oxidation catalyst of the present invention, potassium dititanate ($K_2Ti_2O_5$) is the most preferable. Potassium dititanate may be prepared by subjecting a titanium precursor (e.g., titanium isopropoxide) and a potassium precursor (e.g., potassium carbonate, potassium acetate, or potassium nitrate), serving as a starting material, to a polymerizing complex process or sol-gel process. In addition, potassium dititanate may be prepared through direct solid reaction between $TiO_2$ and a potassium precursor (e.g., potassium carbonate) at a high temperature.

Further, the oxidation catalyst for removing fine soot particulates of the present invention may be prepared by replacing part of potassium cations in a basic structure of potassium dititanate ($K_2Ti_2O_5$) with one or more other cation metals, for example, at least one cation metal selected from the group consisting of Na, Li, Ca, Mg, Ba, Sr, La, Co, Fe, Ni, Cr, Mn, Zn, Cu, Cd, Mo, V, W, Ce, Bi, Sn, Sb, Pd, Pt, Ru and Rh.

Then, the potassium dititanate catalyst, or the catalyst obtained by replacing part of the potassium in the above potassium dititanate catalyst with at least one cation metal selected from the group consisting of Na, Li, Ca, Mg, Ba, Sr, La, Co, Fe, Ni, Cr, Mn, Zn, Cu, Cd, Mo, V, W, Ce, Bi, Sn, Sb, Pd, Pt, Ru and Rh, contacts fine soot particulates included in exhaust gases of incinerators, diesel engines, boilers or other combustion devices, thus removing fine soot particulates.

In addition, the oxidation catalyst of the present invention may be used by directly applying it to an exhaust pipe for the discharge of exhaust gases, or by applying it to a wall of a device for filtering soot particulates or a honeycombed dust filter module for purifying exhaust gases. Thereby, the fine soot particulates adhere on the surface of the oxidation catalyst thus applied, and thus, they are oxidized by oxygen or $NO_x$ present in the exhaust gases and removed. This procedure may be explained as follows:

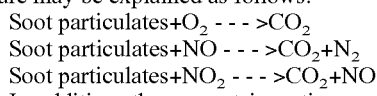

In addition, the present invention provides a method of removing fine soot particulates, which comprises contacting fine soot particulates of exhaust gases with the oxidation catalyst to oxidize the fine soot particulates using oxygen, NO, or $NO_2$ in exhaust gases at 150-650° C., preferably 150-500° C. thus removing fine soot particulates.

The oxidation catalyst of the present invention is directly applied to an exhaust pipe for discharging exhaust gases, or is applied to a wall of a device for filtering soot particulates or a honeycombed module for purifying exhaust gases. Thereby, the oxidation catalyst contacts fine soot particulates of exhaust gases, and thus, the soot particulates are oxidized using oxygen or $NO_x$ at 150° C. or higher, thus removing fine soot particulates. Meanwhile, the fine particulates, precipitated due to the incomplete combustion at a temperature lower than 150° C., begin to burn in the presence of the catalyst of the present invention as the temperature of the diesel engine is increased to 150° C. or higher. Further, the soot particulates are combusted without catalysts at a temperature of higher than 650° C.

To more effectively remove the fine soot particulates from the exhaust gases, the method of the present invention further includes pre-oxidizing NO in the exhaust gases to $NO_2$, before contacting the fine soot particulates with the oxidation catalyst of the present invention. As such, the pre-oxidizing of NO to $NO_2$ may be conducted by using a catalyst (e.g., Pt/alumina) able to oxidize NO to $NO_2$, or by using a high energy device, such as a plasma reactor, pulsed corona, ion beam, etc. able to oxidize NO in the exhaust gases to $NO_2$ at room temperature, removing fine soot particulates.

In this way, the oxidation catalyst including titanium of the present invention may be used to remove fine soot particulates from exhaust gases of diesel engines, incinerators, or boilers, at a lower temperature. Further, since the above catalyst exhibits thermal durability, its activity may be stably maintained even under thermal stress for a long time period. Also, the catalyst eliminates the danger of poisoning from sulfur compounds present in exhaust gases, and can stably maintain its activity.

A better understanding of the present invention may be obtained in light of the following examples which are set forth to illustrate, but are not to be construed to limit the present invention.

EXAMPLE 1

Preparation of Potassium Dititanate ($K_2Ti_2O_5$) Catalyst Having Low Surface Area Mixture powders comprising 0.5 g of $TiO_2$ and 0.43 g of $K_2CO_3$ were uniformly ground using a mortar and pestle while a small amount of ethanol was added to moisten the surface of the powders. After the mixture powders were ground until the ethanol evaporated, they were completely dried at room temperature. This procedure was repeated 3-4 times, and then a sintering process was performed at 850° C. for 10 hr, to obtain an oxidation catalyst. The catalyst thus prepared had a surface area of 0.5 $m^2/g$.

EXAMPLE 2

Preparation of Potassium Dititanate Catalyst Having High Surface Area 9.6 g of citric acid were added to 50 ml of distilled water at 60° C. to prepare an aqueous solution of 1 M citric acid, which was then added with 5 g of titanium isopropoxide and sufficiently stirred. The resultant solution was slowly added with 2.431 g of $K_2CO_3$ while being stirred. After 1 hr, ethyleneglycol was added to the stirred solution to satisfy a stoichiometric ratio versus a metal of 1:1, and then the reaction mixture was stirred for several hours to enter a gel state at 80-90° C. The prepared gel was heat treated in a muffle furnace having sufficient air at 400° C. for 1 hr to form powders, which were then ground using a mortar and pestle and sintered at 850° C. for 10 hr, to obtain an oxidation catalyst. The catalyst thus prepared had a surface area of 2.5 $m^2/g$.

EXAMPLE 3

Preparation of Potassium Dititanate Catalyst Having Partially Replaced Cobalt Ion The potassium dititanate catalyst prepared in Example 2 was added to an aqueous solution of 1 N HCl, stirred at 60-100° C. for 2 hr, filtered and then dried. The dried powders were added to an aqueous solution of 1 N $NH_4NO_3$, stirred at 60-100° C. for 10 hr, and then filtered. The dried powders were heat treated at 450° C. for 5 hr. The powders thus heat treated were added to an aqueous solution of 0.25 N cobalt ion-containing precursor (e.g., $Co(NO_3)_2$), stirred at 80° C. for 10 hr, filtered and then dried. The dried product was sintered at 450° C. for 5 hr, to obtain a catalyst ($K_{1.4}Co_{0.3}Ti_2O_5$) having cobalt ions and potassium ions at a molar ratio of 3:14.

COMPARATIVE EXAMPLE 1

Preparation of $La_{0.8}K_{0.2}CoO_3$ Catalyst Having High Surface Area

To compare with the activity of the potassium dititanate catalyst of the present invention, a Perovskite type $La_{0.8}K_{0.2}CoO_3$ catalyst disclosed in U.S. Pat. No. 5,622,680 was prepared. The $La_{0.8}K_{0.2}CoO_3$ catalyst was synthesized as follows. That is, 3 g of lanthanum acetate, 0.233 g of potassium acetate, and 2.95 g of cobalt acetate, serving as a precursor, were each completely dissolved in distilled water, and then the obtained precursor solutions were mixed. The reaction of the mixed solution took place for 6 hr or more, after which all solution material was removed using a vacuum evaporator. The obtained powders were heat treated in a muffle furnace having sufficient air at 400° C. for 1 hr, and subsequently, the heat treated powders were ground using a mortar and pestle. The ground powders were sintered at 850° C. for 10 hr, to obtain a catalyst. The catalyst thus prepared had a surface area of 15.7 $m^2/g$.

COMPARATIVE EXAMPLE 2

Preparation of $La_{0.8}K_{0.2}CoO_3$ Catalyst Having Low Surface Area

Mixture powders comprising 1 g of CoO, 0.184 g of $K_2CO_3$, and 1.74 g of $La_2O_3$ were ground by applying physical force while a small amount of ethanol was added to moisten the surface of the powders. After the mixture powders were ground until the ethanol evaporated, they were completely dried at room temperature. This procedure was repeated 3-4 times, after which a sintering process was performed at 850° C. for 10 hr, to obtain a catalyst. The catalyst thus prepared had a surface area of 1.5 $m^2/g$.

COMPARATIVE EXAMPLE 3

Preparation of 1% Pt/Alumina Catalyst

An aqueous solution of $H_2PtCl_6$ was added in droplets at a stoichiometric ratio to γ-alumina (280 $m^2/g$) powders while being stirred. The powders obtained by mixing all precursor solutions were sintered at 500° C. for 6 hr, and then reduced at 450° C. for 1 hr in a 5% $H_2$ atmosphere before reaction, to obtain Pt/γ-alumina.

Assay of Activity of Catalyst on Removal of Fine Soot Particulates

Oxidation experiments of fine soot particulates were carried out using the catalysts prepared in Examples 1 to 3 and Comparative Examples 1 to 3 at their different reaction temperatures. To this end, a mixture comprising soot particulates and a catalyst mixed at a ratio of 1:10 was loaded into a reactor, through which nitrogen gas including 5% oxygen and 0.5% NO (a main exhaust gas component of diesel engines) was passed at a rate of 20,000 L/kg cat-h. As such, while the temperature was increased according to Temperature Programmed Oxidation procedures, the amount of $CO_2$ discharged from the outlet portion of the reactor was measured. The results are summarized in Table 1, below.

TABLE 1

Oxidation Temperature Of Particulates with Various Catalysts

| | $T_{ig}$ | $T_{max}$ | $T_{90}$ |
|---|---|---|---|
| Blank | 430 | 580 | 610 |
| $K_2Ti_2O_5$ (Ex. 1) | 220 | 340 | 348 |
| $K_2Ti_2O_5$ (Ex. 2) | 220 | 337 | 345 |
| $K_{1.4}Co_{0.3}Ti_2O_5$ (Ex. 3) | 224 | 340 | 350 |
| $La_{0.8}K_{0.2}CoO_3$ of high Surface Area (C. Ex. 1) | 275 | 380 | 560 |
| $La_{0.8}K_{0.2}CoO_3$ of low Surface Area (C. Ex. 2) | 300 | 540 | 630 |
| 1% Pt/Alumina (C. Ex. 3) | 320 | 420 | 480 |

$T_{ig}$: Temperature at which soot particulates begin to ignite
$T_{max}$: Temperature at which soot particulates are removed at a maximum rate
$T_{90}$: Temperature at which 90% or more of soot particulates are removed As is apparent from Table 1, when using the catalysts prepared in Examples 1 to 3 according to the present invention, a temperature, at which soot particulates are maximally removed, is lowered by at least 40° C. than when using conventional catalysts, regardless of preparation process. On the other hand, when the $La_{0.8}K_{0.2}CoO_3$ catalyst having a high surface area, as a conventional catalyst, directly contacts soot particulates, a temperature, at which soot particulates are maximally removed, is 380° C. However, as the above catalyst is attached to the surface of a honeycombed module for the oxidation experiment, a temperature, at which soot particulates are maximally removed, is 480° C. From this, it can be seen that the above conventional catalyst has drastically decreased activity, and the reaction temperature thereof is largely different from the exhaust temperature of diesel engines. In addition, when using Pt/alumina, which is known to be a typical catalyst for use in the removal of fine soot particulates, a temperature, at which fine soot particulates are removed, is increased by about 100° C. than when using the catalyst of the present invention, and thus, the activity of the Pt/alumina is decreased. As well, the Pt/alumina catalyst has limitations such as low price competitive power due to the use of expensive precious metal. However, potassium dititanate of the present invention is advantageous because it is inexpensive.

Assay of Activity of Catalyst on Removal of Fine Soot Particulates Varying with Kind of Exhaust Gas For the exhaust gases discharged from diesel automobiles including not only oxygen, NO and $NO_2$ but also 50-100 ppm $SO_2$, the activity of the catalyst of the present invention was measured using the same reaction device as in the above assay by varying the kind of feeding gases. The results are given in Table 2, below.

TABLE 2

Oxidation Of Soot Particulates Varying With Kind Of Feeding Gas

| Catalyst (Exhaust Gases) | $T_{ig}$ | $T_{max}$ | $T_{90}$ |
|---|---|---|---|
| $K_2Ti_2O_5$ (5% $O_2$) (Ex. 1) | 230 | 348 | 355 |
| $K_2Ti_2O_5$ (5% $O_2$, 0.5% NO) (Ex. 1) | 220 | 340 | 348 |
| $K_2Ti_2O_5$ (5% $O_2$, 0.1% $NO_2$) (Ex. 1) | 150 | 248 | 280 |
| $K_2Ti_2O_5$ (5% $O_2$, 0.1% NO, 0.01% $SO_2$) (Ex. 1) | 310 | 375 | 394 |
| $La_{0.8}K_{0.2}CoO_3$ (5% $O_2$, 0.5% NO) (C. Ex. 1) | 275 | 380 | 560 |
| $La_{0.8}K_{0.2}CoO_3$ (5% $O_2$, 0.1% NO, 0.01% $SO_2$) (C. Ex. 1) | 450 | 522 | 530 |

As is apparent from Table 2, since the Perovskite type cobalt catalyst has the reaction temperature increased to 450-530° C. due to the sulfide poisoning, it cannot be used to actually treat the exhaust gases. On the other hand, it appears that the catalysts of the present invention prevent poisoning. Further, in the case where $NO_2$ is present in the exhaust gases, the reaction temperature of the catalyst of the present invention is remarkably decreased to 150-280° C. Hence, it can be confirmed that the catalyst of the present invention is effective for the removal of soot particulates, taking into account that the actual exhaust gas temperature of diesel engines ranges from 150 to 350° C.

As described hereinbefore, the present invention provides an oxidation catalyst for removing fine soot particulates and a method of removing fine soot particulates using the catalyst. The oxidation catalyst of the present invention can be used to effectively remove fine soot particulates at a low temperature. Further, the oxidation catalyst has thermal durability, and thus, its activity may be maintained even under thermal stress for a long time period. Also, the catalyst prevents poisoning due to sulfur compounds present in exhaust gases, and can maintain stable activity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An oxidation catalyst for removing fine soot particulates, represented by the formula:

$$K_a M_b Ti_2 O_5$$

wherein

M, if present, is at least one cation metal selected from the group consisting of Na, Li, Ca, Mg, Ba, Sr, La, Co, Fe, Ni, Cr, Mn, Zn, Cu, Cd, Mo, V, W, Ce, Bi, Sn, Sb, Pd, Pt, Ru and Rh;

a is equal to or less than 2; and b is 0 to 2/n, wherein n is a cation charge of metal element M further wherein said oxidation catalyst has a surface area of about 0.5 m²/g to about 2.5 m²/g.

2. The oxidation catalyst of claim 1, wherein M is not present and a is 2.

3. The oxidation catalyst of claim 1, wherein a is 1.4, M is Co, and b is 0.3.

4. A method of removing fine soot particulates, said method comprising:

contacting fine soot particulates included in exhaust gasses at a temperature of 150-500° C. with an oxidation catalyst represented by the formula $$K_a M_b Ti_2 O_5,$$

wherein M, if present, is at least one cation metal selected from the group consisting of Na, Li, Ca, Mg, Ba, Sr, La, Co, Fe, Ni, Cr, Mn, Zn, Cu, Cd, Mo, V, W, Ce, Bi, Sn, Sb, Pd, Pt, Ru and Rh; a is equal to or less than 2; and, b is 0 to 2/n, wherein n is a cation charge of metal element M and said oxidation catalyst has a surface area of about 0.5 m²/g to about 2.5 m²/g; and oxidizing the fine soot particulates using oxygen, NO, or $NO_2$ in said exhaust gases to remove said fine soot particulates.

5. The method of claim 4, wherein the oxidation catalyst is directly applied to an exhaust pipe for discharging exhaust gasses, or directly applied to an internal wall of a device for filtering soot particulate or a honeycombed dust filter module for purifying exhaust gasses.

6. The method as set forth in claim 4, further comprising pre-oxidizing NO in the exhaust gases to $NO_2$, before contacting the fine soot particulates with the oxidation catalyst.

7. The method as set forth in claim 4, wherein the exhaust gases are discharged form a diesel engine, incinerator, boiler or other combustion devices.

8. The method of claim 4, wherein M is not present and a is 2.

9. The method of claim 4, wherein a is 1.4, M is Co, and b is 0.3.

10. The method of claim 4, wherein said temperature is 150-340° C.

* * * * *